United States Patent
Glasbrenner

(10) Patent No.: US 6,617,031 B1
(45) Date of Patent: Sep. 9, 2003

(54) ISOCYANATE-BASED LAMINATING ADHESIVES

(75) Inventor: Brian S. Glasbrenner, Brooklyn Park, MN (US)

(73) Assignee: H. B. Fuller Licensing & Financing Inc., St. Paul, MN (US)

( * ) Notice: Subject to any disclaimer, the term of this patent is extended or adjusted under 35 U.S.C. 154(b) by 0 days.

(21) Appl. No.: 09/042,735

(22) Filed: Mar. 17, 1998

Related U.S. Application Data

(62) Division of application No. 08/651,648, filed on May 22, 1996, now abandoned.

(51) Int. Cl.$^7$ .................. B32B 27/40; B32B 27/00; C09J 175/06; C09J 175/08; C09J 175/04
(52) U.S. Cl. .................. 428/423.1; 156/331.4; 156/331.7; 206/813; 428/425.1; 428/425.8; 428/423.5; 428/423.7; 428/424.2; 428/424.4; 428/424.6; 428/424.8; 428/311.71; 428/319.3; 528/66; 528/76; 528/80; 528/83; 528/905
(58) Field of Search .................. 156/331.4, 331.7; 428/423.1, 425.1, 425.8, 423.5, 423.7, 424.2, 424.4, 424.6, 424.8, 311.71, 319.3; 528/66, 76, 80, 83, 905; 206/813

(56) References Cited

U.S. PATENT DOCUMENTS

| | | | | |
|---|---|---|---|---|
| 3,915,935 A | * | 10/1975 | Abraham et al. | 528/66 |
| 4,280,979 A | * | 7/1981 | Dunleavy et al. | 264/157 |
| 4,486,508 A | * | 12/1984 | Coughlin et al. | 427/385.5 |
| 4,487,909 A | * | 12/1984 | Coughlin et al. | 528/60 |
| 4,994,540 A | * | 2/1991 | Boerner et al. | 528/44 |
| 5,278,223 A | * | 1/1994 | Gruenewaelder et al. | 524/502 |

FOREIGN PATENT DOCUMENTS

| | | | |
|---|---|---|---|
| EP | 590398 | * | 4/1994 |

* cited by examiner

Primary Examiner—Rabon Sergent
(74) Attorney, Agent, or Firm—Bin Su

(57) ABSTRACT

The invention relate to a method of laminating flexible packaging, articles of manufacture and bonded laminates. The method comprises employing a laminating adhesive comprising an isocyanate-based composition comprising the reaction product of at least one polymeric polyol (part A) comprising the reaction product of at least one alkylene diol at least one diol; containing a pendant aliphatic chain; and at least one dicarboxylic acid; with at least one NCO terminated polyurethane prepolymer (part B) comprising the reaction product of at least one polyether polyol; and at least one polyisocyanate. The low viscosity laminating adhesive has enhanced processing characteristics at reduced temperature.

21 Claims, No Drawings

ISOCYANATE-BASED LAMINATING ADHESIVES

The application is a divisional application of U.S. application Ser. No. 08/651,648 filed on May 22, 1996, now abandoned.

FIELD OF THE INVENTION

The invention relates to solventless laminating adhesives, specifically to isocyanate-based formulations having enhanced processing characteristics at reduced temperatures.

BACKGROUND OF THE INVENTION

It is known that isocyanate-based formulations are useful laminating adhesives for flexible packaging. The solventless formulations, which consist of a polyol (part A) and an NCO-terminated polyurethane prepolymer (part B), are meter-mixed immediately before the laminating process and used to adhere superposed layers of one or more materials. For example, European Patent Application #93114668.2 discloses such formulations wherein the part A and part B components are meter-mixed at temperatures between 20° C. and 50° C.

A drawback in this prior art reference is the formulation's initial viscosity. The formulations, which have initial viscosities greater than 25,000 mPa·s at 25° C.+/−5.0° C., are difficult to process.

Therefore, there remains a need for solventless isocyanate-based laminating adhesives having enhanced processing characteristics at reduced temperatures.

SUMMARY OF THE INVENTION

The present invention is directed to solventless isocyanate-based formulations, which are useful as laminating adhesives for flexible packaging, comprising the reaction product of:
  A) at least one polymeric polyol (part A) comprising;
    1) at least one alkylene diol;
    2) at least one diol containing a pendant aliphatic chain;
    3) at least one dicarboxylic acid; with
  B) at least one NCO-terminated polyurethane prepolymer (part B) comprising;
    1) at least one polymeric polyol; and
    2) at least one polyisocyanate.

The part A components which have viscosities less than about 12,000 mPa·s at 25° C.+/−5.0° C. improve the meter-mix process, through enhanced flow rates, without the addition of heat.

Surprisingly, the formulations of the present invention have initial viscosities less than about 25,000 mPa·s at 25° C.+/−5.0° C. These properties enhance safety and simplify processing on conventional meter-mix units. For example, combining the part A and part B components without additional heat reduces worker exposure hazards to volatile isocyanates present in the part B component. Although distillation methods can reduce the volatile isocyanates present in the part B component to less than about 0.1% by weight, the small quantities which remain can still generate safety hazards when heated.

The present invention further comprises a method wherein the adhesive formulations are processed on laminator units at temperatures of about 75° C. and line speeds from about 200 meters/min. to about 500 meters/min. Lower temperatures are preferred during the solventless laminating process. For example, elevated temperatures accelerate the isocyanate/hydroxyl reaction to generate viscous materials. Viscous materials tend to mist on solventless laminators which are run at high line speeds. Misting is a phenomenon wherein adhesive droplets are thrown into the air generating safety hazards and non-uniform coat weights. The inventive formulations can be processed, on solventless laminators without misting, at temperatures of less than about 75° C. and line speeds from about 200 meters/min. to about 500 meters/min.

The adhesive formulations have good adhesion characteristics on substrates such as wood, metal, plastic and synthetic polymers. Examples include paper, polyethylene, polypropylene, polyester, nylon, wood, ethylene vinyl acetate, cellophane, polyvinyl chloride, surlyn, aluminum and metallized films.

Said formulations are particularly useful film to film laminating adhesives in durable-goods applications and applications having indirect food contact.

DETAILED DESCRIPTION OF THE INVENTION

At least one low molecular weight alkylene diol is used in the preparation of the part A component. The alkylene diols have hydroxyl numbers, as determined by ASTM designation E-222-67 (Method B), in a range from about 130 to about 1250, and preferably from about 950 to about 1250. Suitable examples include ethylene glycol, 1,3-propanediol, 1,4-butanediol, 1,5-pentanediol, 1,6-hexanediol, 1,8-octanediol, 1,4-bis-(hydroxymethyl)-cyclohexane, furan dimethylol, and mixtures thereof. Preferred alkylene diols are 1,4-butanediol, 1,6-hexanediol and mixtures thereof. The diols are present in a range from about 5.0% by weight to about 25.0% by weight, and preferably from about 10.0% by weight to about 20.0% by weight, based on 100 parts total part A solids.

Low molecular weight polyols containing alkoxy groups may be used in the preparation of the part A component. Suitable examples include diethylene glycol, polyethylene ether glycol, polypropylene ether glycols, polytetramethylene ether glycols and their mixtures. The polyols can have hydroxyl numbers in a range from about 130 to about 1250, and preferably from about 950 to about 1250 and can be present in the part A component in a range from about 5.0% by weight to about 50.0% by weight, and preferably from about 10.0% by weight to about 40.0% by weight, based on 100 parts total part A solids.

A least one low molecular weight diol component containing a pendant aliphatic chain are used in the preparation of the part A component. The term "pendant" is defined as a hydrophobic group which extends from the polymer chain. The diols can have hydroxyl numbers in a range from about 130 to about 1250, and preferably from about 950 to about 1250. Examples include 1,2-propanediol, 1,2-butanediol, 1,3-butanediol and 2,3-butanediol, 2,2-methyl-1,3-propanediol, 2,2,4-trimethyl-1,3-pentanediol, neopentyl glycol, 2-butyl-2-ethyl-1,3-propanediol and bis-2-hydroxyethyl lauramide and 1,2-dodecanediol. The diols can be present in the part A component in a range from about 5.0% by weight to about 50.0% by weight, and preferably from about 10.0% by weight to about 40.0% by weight, based on 100 parts total part A solids. It is surmised that some of the adhesive formulations' unique properties can be attributed to the pendant aliphatic chains present in the part A component.

Higher functional polyols may be used in the preparation of the part A component. Suitable examples include glycerol, trimethylolpropane, 1,2,4-butane triol, 2,6-hexane triol and mixtures thereof. The preferred higher functional polyols are glycerol and trimethylolpropane. Said polyols may be present in a range from about 1.0% by weight to about 15.0% by weight, and preferably from about 5.0% by weight to about 10.0% by weight, based on 100 parts total part A solids.

At least one polycarboxylic acid component is used in the preparation of the part A component. The polycarboxylic acid may be aliphatic, cycloaliphatic, aromatic and mixtures thereof. Suitable examples include oxalic acid, malonic acid, succinic acid, glutaric acid, adipic acid, pimelic acid, suberic acid, azelaic acid, sebacic acid, maleic acid, fumaric acid, phthalic acid, isophthalic acid, terphthalic acid, diethyl succinic acid and 1,4-cyclohexane dicarboxylic acid. The preferred polycarboxylic acid components are adipic acid, isophthalic acid and mixtures thereof. The polycarboxylic acids can be present in the part A component in a range from about 50.0% by weight to about 85.0% by weight, and preferably from about 50.0% by weight to about 70.0% by weight, based on 100 parts total part A solids.

The resulting polymeric polyols, which are the condensates of said polyhydroxyl and polycarboxylic acid components previously described, have viscosities less than about 12,000 mPa·s at 25° C. Suitable available polymeric polyols include Rucoflex® XF-5604-210 which is a polyester polyol from Ruco Corporation (Hicksville, N.Y.) based on adipic acid, isophthalic acid, glycerol, 1,6-hexanediol and neopentyl glycol. It is surmised that multibranched polymeric polyols (i.e., aliphatic pendant chains) reduce the crystalline nature of the part A component enhancing its flow characteristics at reduced temperatures. The effects of chain branching on polymer viscosity is described in "Polymer Process Engineering", Eric A. Grulke, chapter 8, pp 363–440, Prentice-Hall, N.J., 1994.

If desired, polymeric polyols free of pendant aliphatic-.chains may be used in combination with the polymeric polyols previously described. The materials are blended in such proportions that the resulting hydroxyl value is about 140 mg KOH/grams material and their viscosities are about 12,000 mPa·s at 25° C. The polymeric polyols, which are free of pendant aliphatic chains, include polyester polyols, polyether polyols, polyesterether polyols and mixtures thereof. A suitable example includes Rucoflex® S-1011-55 which is a polyesterether polyol based on adipic acid and diethylene glycol.

Additionally, small quantities of organic amine catalysts may be used to accelerate the hydroxyl/isocyanate reaction. The amine catalysts can be present in a range from about 0.05% by weight to about 2.0% by weight, and preferably from about 0.13% by weight to about 0.15% by weight, based on 100 parts total part A solids. An example includes Dabco® 33-LV from Air Products and Chemicals, Inc. (Allentown, Pa.) which is 1,4-diazobicyclooctane triethene-amine.

The NCO-terminated polyurethane prepolymers (part B) are prepared by methods known in the art. For example, a stoichiometric excess of diisocyanate is reacted with a polymeric polyol. The polyisocyanate can be selected from the group consisting of linear aliphatic, branched aliphatic, cyclic aliphatic, aromatic and mixtures thereof. The polymeric polyols can be polyester polyols, polyether polyols, polyesterether polyols and mixtures thereof. The reactants are in such proportions that the resulting percent isocyanate is in a range from about 5.0% by weight to about 10.0% by weight, and preferably from about 7.0% by weight to about 8.0% by weight, based on 100 part total part B solids. The resulting part B component can have viscosities less than about 25,000 mPa·s at 25° C.+/−5.0° C. and residual isocyanate monomer less than about 0.1% by weight. A suitable part B component includes Airthane® PPT-65 L from Air Products and Chemicals Inc. (Allentown, Pa.) which is based on toluene diisocyanate and polypropylene glycol.

The polymeric polyol (part A) and the NCO-terminated polyurethane prepolymer (part B) are blended together, immediately before the laminating process, without additional heat. The equivalence ratio of hydroxyl component (part A) to isocyanate component (part B) are in a range from about 1.0:1.0 to about 1.0:1.8, and preferably from about 1.0:1.2 to about 1.0:1.6.

The part A and part B components are blended together using conventional meter-mix equipment. An example is the twin mixer machine type CTF from Liquid Control Corporation (North Canton, Ohio). The unit can meter and dispense, the formulations described in the present invention, using mix ratios of 1:1 to about 30:1 and can have flow rates from about 150 cu.cms./min. to about 360 cu.cms./min. using air pressures from about 2.8 kg/sq.cm. to about 5.624 kg/sq.cm.

The isocyanate-based laminating adhesive formulations are dispensed onto rollers, within the solventless laminating unit, which have been heated to about 70° C. A suitable solventless laminator is the PCMC F-100 coater/laminator from Paper Converting Machine Company (Greenbay, Wis.). Said formulations are roll coated onto a primary substrate at a line speed from about 200 meters/min. to about 500 meters/min. and then mated with a secondary film using a combining nip from about 1.0 kg/sq.cm. to about 70 kg/sq.cm.

The present invention is further illustrated by the following non-limiting examples.

The following test methods were used:
Initial Viscosity Testing
The adhesive formulations were heated to 70° C., to simulate laminating conditions, and tested with a Brookfield viscometer-model RTV from Brookfield Engineering Laboratories, Inc. (Stoughton, Mass.) using spindle #27 at 50 rpm.
Rheology Testing
Viscosity profiles were evaluated on a Physica Rheometer-model UM from Paar Physica Company (Edison, N.J.). The rheometer had a 25 millimeter diameter test fixture and was run at a constant stress using the parallel plate method.
Peel Adhesion
Laminates were aged for 1, 3 and 7 days then cut into 2.54 cm. by 20.32 cm. strips. The strips were tested for 180° peel values on a friction/peel tester (model 225-1) from Thwing-Albert Instruments Company (Philadelphia, Pa.) using a crosshead speed of 30.48 cm./min.

EXAMPLES

Example 1 describes the flow characteristics of a blend of polymeric polyols (part A).

To a dry container was charged 47.93 grams (0.05 hydroxyl equivalence) Rucoflex® XF-5752-65, 51.93 grams (0.19 hydroxyl equivalence) Rucoflex® XF-5604-210 and 0.14 grams Dabco® 33-LV. The polyester blend had a viscosity of 11,500 mPa·s at 25° C.

Example 2 describes an isocyanate-based formulation and its rheological properties.

To a dry container was charged Airthane® PPT-65L (part B) and the part A component described in Example 1. The formulation, using a mix weight ratio of 1.913/1.0, had an initial viscosity of 20,500 mPa·s at 25° C. showing the utility of the invention.

Example 3 describes the viscosity profile of the formulation described in Example 1. The formulation was heated to 70° C. over a 20-minute period to simulate the solventless laminating process.

| Time (Seconds) | Viscosity (mpa's) |
|---|---|
| Initial | 750 |
| 200 | 1,000 |
| 400 | 1,500 |
| 600 | 2,000 |
| 800 | 2,750 |
| 1000 | 3,750 |
| 1200 | 4,750 |

This viscosity profile shows the utility of the invention in that less viscous materials enhance the solventless laminating process.

Example 4 describes 180° peel values on various substrates after the laminates have been aged 7 days, with the formulation described in Example 2.

| Substrates | Grams |
|---|---|
| Polyester/Aluminum Foil (2.0 mils/1.0 mils) | 800 grams |
| Polyester/Polyester (2.0 mil/2.0 mil) | 700 grams |
| Polyester/Polyethylene (48 ga/1.5 mil) | Substrate Failure |
| Polypropylene/Polypropylene (1.0 mil/75 ga) | Substrate Failure |
| Polypropylene/Metallized Polypropylene (1 mil/70 ga) | Substrate Failure |
| Polyethylene/Polyethylene (1.5 mil) | Substrate Failure |
| Polypropylene/Polyethylene (1 mil/1.5 mil) | Substrate Failure |

Comparative Data

Example 5 describes the preparation and properties of a solvent-free two-component polyurethane adhesive described in European Application #93114668.2 (Bayer AG).

To a dry container was charged 100.0 grams (0.2493 hydroxyl equivalence) Baycoll® AS1155 which is a polyester polyol from Bayer Corporation based on 1,6-hexanediol, trimethylolpropane, isophthalic acid, adipic acid, phthalic acid and 240.0 grams (0.3429 hydroxyl equivalence) KA8585 which is a NCO-terminated polyurethane prepolymer from Bayer Corporation based on polypropylene glycol and toluene diisocyanate. The formulation had an initial viscosity of 60,000 mPa·s at 25° C. Higher viscosity materials are difficult to meter-mix and process on solventless laminators run at high line speeds.

What is claimed is:

1. A method of laminating flexible packaging comprising the steps of:
   a) providing a laminating adhesive comprising an isocyanate composition comprising the reaction product of:
      i) at least one polymeric polyol (part A) comprising the condensation product of:
         1) at least one alkylene diol having a hydroxyl number in a range of from about 950 to about 1250;
         2) at least one diol containing a pendant aliphatic chain having a hydroxyl number in a range of from about 950 to about 1250; and
         3) at least one dicarboxylic acid; with
      ii) at least one NCO-terminated polyurethane prepolymer (part B) comprising the reaction product of:
         1) at least one polyether polyol; and
         2) at least one polyisocyanate;
         wherein the equivalence ratio of hydroxyl component (part A) to isocyanate component (part B) is in a range of from about 1.0:1.2 to about 1.0:1.6; and said parts are blended together to form a laminating adhesive having an initial viscosity less than about 25,000 mPa·s at 25 C.+/−5 C.;
   b) providing at least one first flexible substrate;
   c) applying a layer of said adhesive to a surface of at least one portion of said first substrate;
   d) contacting the adhesive coated surface portion of first substrate with at least a portion of the surface of a second substrate; and
   e) allowing the said adhesive to bond the first and second substrate together.

2. The method according to claim 1 wherein the viscosity of the polymeric polyol is less than about 12,000 mPas at 25° C.

3. The method according to claim 1 wherein the alkylene diol is present in a range of from about 10.0% by weight to about 20.0% by weight and the polyol is present in a range of from about 10.0% by weight to about 40.0% by weight.

4. The method according to claim 1 wherein the hydroxyl value of the polmeric polyol is about 140 mg KOH/grams.

5. The method according to claim 1 wherein the adhesive is applied to the first substrate by roll coating.

6. The method according to claim 1 wherein at least one of said substrates is a member selected from the group consisting of wood, metal, plastic and synthetic polymers.

7. The method according to claim 1 wherein said substrate is selected from the group consisting of paper, polyethylene, polypropylene, polyester, nylon, ethylene vinyl acetate, cellophane, aluminum and metallized films, surlyn and polyvinyl chloride.

8. The method according to claim 1 wherein components (part A) and (part B) are meter-mixed without the addition of heat.

9. The method according to claim 8 wherein said meter-mixed components of (part A) and (part B) have initial viscosities of less than about 25,000 mPa·s.

10. The method according to claim 9 wherein said meter-mixed components are processed on solventless laminating units at a temperature less than about 75° C.

11. A film laminate comprising a pair of flexible film substrates bonded with a laminating adhesive comprising an isocyanate composition comprising the reaction product of:
   a) at least one polymeric polyol (part A) comprising the condensation product of:
      i) at least one [linear] alkylene diol having a hydroxyl number in a range of from about 950 to about 1250;
      ii) at least one diol containing a pendant aliphatic chain having a hydroxyl number in a range of from about 950 to about 1250; and
      iii) at least one dicarboxylic acid; with
   b) at least one NCO-terminated polyurethane prepolymer (part B) comprising the reaction product of:
      i) at least one polyether polyol; and
      ii) at least one polyisocyanate;
   wherein the equivalence ratio of hydroxyl component (part A) to isocyanate component (part B) is in a range of from about 1.0:1.2 to about 1.0:1.6; and said parts are blended together to form a laminating adhesive having an initial viscosity less than about 25,000 mPa·s at 25° C.+/−5.0° C.

12. The laminate according to claim 11 wherein at least one of said substrates is selected from the group consisting of paper, polyethylene, polypropylene, polyester, nylon, ethylene vinyl acetate, cellophane, aluminum and metallized films, surlyn and polyvinyl chloride.

13. A flexible package comprising a joint between a plurality of sections of at least one flexible substrate bonded together by a layer of laminating adhesive according to claim 11 comprising an isocyanate composition comprising the reaction product of:
   a) at least one polymeric polyol (part A) comprising the condensation product of:
      i) at least one alkylene diol;
      ii) at least one diol containing a pendant aliphatic chain; and
      iii) at least one dicarboxylic acid; with
   b) at least one NCO-terminated polyurethane prepolymer (part B) comprising the reaction product of;
      i) at least one polyether polyol; and
      ii) at least one polyisocyanate;
      wherein said parts are blended together to form a laminating adhesive having an initial viscosity less than about 25,000. mPa·s at 25° C.+/−5.0° C.

14. The flexible package according to claim 13 wherein at least one of said substrates is a member selected from the group consisting of metal, plastic, synthetic polymers and wood.

15. The flexible package according to claim 13 wherein at least one of said substrate is selected from the group consisting of paper, polyethylene, polypropylene, polyester, nylon, ethylene vinyl acetate, cellophane, aluminum and metallized films, surlyn and polyvinyl chloride.

16. A bonded assembly comprising at least a pair of substrates adhesively bonded with a laminating adhesive comprising:
   a) at least one polymeric polyol (part A) comprising the condensation product of:
      1) at least one alkylene diol having a hydroxyl number in a range of from about 950 to about 1250;
      2) at least one diol containing a pendant aliphatic chain having a hydroxyl number in a range of from about 950 to about 1250; and
      3) at least one dicarboxylic acid; with
   b) at least one NCO-terminated polyurethane prepolymer (part B) comprising the reaction product of:
      1) at least one polyether polyol; and
      2) at least one polyisocyanate;
      wherein the equivalence ratio of hydroxyl component (part A) to isocyanate component (part B) is in a range of from about 1.0:1.2 to about 1.0:1.6; and said parts are blended together to form a laminating adhesive having an initial viscosity less than about 25,000 mPa·s at 25 C +/−5 C.

17. The bonded assembly according to claim 16 wherein at least one of said substrates is a member selected from the group consisting of metal, plastic, synthetic polymers and wood.

18. The bonded assembly according to claim 16 wherein at least one of said substrate is selected from the group consisting of paper, polyethylene, polypropylene, polyester, nylon, ethylene vinyl acetate, cellophane, aluminum and metallized films, surlyn and polyvinyl chloride.

19. An article of manufacture comprising:
   a) at least one flexible substrate;
   b) at least one joint between a section of said substrate and another section of said substrate and another section of same or different substrate; and
   c) a layer of laminating adhesive comprising an isocyanate composition comprising the reaction product of:
      i) at least one polymeric polyol (part A) comprising the condensation product of:
         1) at least one alkylene diol having a hydroxyl number in a range of from about 950 to about 1250;
         2) at least one diol containing a pendant aliphatic chain having a hydroxyl number in a range of from about 950 to about 1250; and
         3) at least one dicarboxylic acid; with
      ii) at least one NCO-terminated polyurethane prepolymer (part B) comprising the reaction product of:
         1) at least one polyether polyol; and
         2) at least one polyisocyanate;
         wherein the the equivalence ratio of hydroxyl component (part A) to isocyanate component (part B) is in a range of from about 1.0:1.2 to about 1.0:1.6; and the laminating adhesive has an initial viscosity less than about 25,000 mPa·s at 25 C+/−5 C.

20. The article according to claim 19 wherein at least one of said substrates is a member selected from the group consisting of metal, plastic, synthetic polymers and wood.

21. The article according to claim 19 wherein at least one of said substrate is selected from the group consisting of paper, polyethylene, polypropylene, polyester, nylon, ethylene vinyl acetate, cellophane, aluminum and metallized films, surlyn and polyvinyl chloride.

* * * * *

UNITED STATES PATENT AND TRADEMARK OFFICE
CERTIFICATE OF CORRECTION

PATENT NO.    : 6,617,031 B1
DATED         : September 9, 2003
INVENTOR(S)   : Brian S. Glasbrenner It is certified that error appears in the above-identified patent and that said Letters Patent is hereby corrected as shown below:

Column 6,
Line 14, "at 25 C.+/-5.C." should read -- at $25^0$ C. +/- $5^0$ C. --.
Line 56, "[linear]" should be deleted.

Column 8,
Lines 8 and 42, "at 25 C.+/-5.C." should read -- at $25^0$ C. +/- $5^0$ C. --.

Signed and Sealed this

Twenty-second Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,617,031 B1
DATED : September 9, 2003
INVENTOR(S) : Brian S. Glasbrenner It is certified that error appears in the above-identified patent and that said Letters Patent is hereby corrected as shown below:

Column 6,
Line 14, "at 25 C.+/-5 C." should read -- at 25º C. +/-5º C. --.
Line 56, "[linear]" should be deleted.

Column 8,
Lines 8 and 42, "at 25 C.+/-5 C." should read -- at 25º C. +/-5º C. --.

Signed and Sealed this

Third Day of August, 2004

JON W. DUDAS
*Acting Director of the United States Patent and Trademark Office*